(12) United States Patent
Peck

(10) Patent No.: US 7,947,903 B2
(45) Date of Patent: May 24, 2011

(54) SNAP-ON WALL PLATE ASSEMBLY

(75) Inventor: David M. Peck, Danbury, CT (US)

(73) Assignee: Hubbell Incorporated, Shelton, CT (US)

( * ) Notice: Subject to any disclaimer, the term of this patent is extended or adjusted under 35 U.S.C. 154(b) by 245 days.

(21) Appl. No.: 12/337,772

(22) Filed: Dec. 18, 2008

(65) Prior Publication Data

US 2010/0155099 A1  Jun. 24, 2010

(51) Int. Cl.
*H05K 5/03* (2006.01)

(52) U.S. Cl. ............... 174/66; 174/67; 174/58; 174/50; 248/906; 439/535

(58) Field of Classification Search ............ 174/50, 174/58, 59, 60, 135, 66, 67; 220/4.02, 241, 220/242; 439/535; 248/56, 906
See application file for complete search history.

(56) References Cited

U.S. PATENT DOCUMENTS

| | | | |
|---|---|---|---|
| 1,840,582 A | 1/1932 | Hubbell | |
| 3,168,612 A | 2/1965 | Sorenson | |
| 3,197,549 A | 7/1965 | Good | |
| 3,329,785 A | 7/1967 | Baer et al. | |
| 3,987,928 A | 10/1976 | Mori | |
| 4,211,905 A | 7/1980 | Quigley | |
| 4,340,795 A | 7/1982 | Arthur | |
| 4,631,354 A | 12/1986 | Boteler | |
| 4,733,330 A | 3/1988 | Tanaka et al. | |
| 5,180,886 A | 1/1993 | Dierenbach et al. | |
| 5,189,259 A | 2/1993 | Carson et al. | |
| 5,723,817 A | 3/1998 | Arenas et al. | |
| 5,895,888 A | 4/1999 | Arenas et al. | |
| 5,900,584 A | 5/1999 | Cady et al. | |
| 6,923,663 B2 | 8/2005 | Oddsen et al. | |
| 7,102,081 B2 | 9/2006 | Xu et al. | |
| 7,122,740 B2 | 10/2006 | Xu et al. | |
| D550,076 S | 9/2007 | Ni | |
| 7,306,482 B1 | 12/2007 | Kidman | |
| 7,485,806 B1 * | 2/2009 | Gretz ........................ | 174/59 |
| 7,667,136 B2 * | 2/2010 | Dinh et al. ............... | 174/58 |
| 7,683,257 B1 * | 3/2010 | Shotey et al. ............ | 174/66 |
| 7,723,613 B2 * | 5/2010 | Slipy et al. .............. | 174/50 |
| 7,732,709 B2 * | 6/2010 | Puri et al. ................ | 174/50 |
| 2008/0006431 A1 | 1/2008 | Oddsen et al. | |

* cited by examiner

*Primary Examiner* — Dhiru R Patel
(74) *Attorney, Agent, or Firm* — Garrett V. Davis; Mark S. Bicks; Alfred N. Goodman

(57) ABSTRACT

The wall cover plate assembly includes a base and a cover for connecting to an electrical box and an electrical wiring device. The base is connected to the electrical box and/or the electrical wiring device by suitable fasteners. The base includes a first coupling member positioned along opposite side edges and second coupling members positioned at each corner of the base plate. A cover includes a first coupling member for engaging the first coupling member on the base plate and connectors for engaging the second coupling members on the base plate. The connectors of the cover are angled with respect to a plane of the cover to engage a connecting member of the second coupling members. The connectors provide a biasing force to engage the second coupling members of the base which increase when the cover plate is pulled outwardly from the base.

23 Claims, 6 Drawing Sheets

SNAP-ON WALL PLATE ASSEMBLY

FIELD OF THE INVENTION

The present invention is directed to a wall plate assembly for covering an electrical device and electrical box opening mounted in a wall structure. The invention is particularly directed to a snap-on wall cover plate assembly that is able to fit uniformly against the wall surface.

BACKGROUND OF THE INVENTION

Wiring devices such as a switch or electrical receptacle are typically mounted in an electrical box which is in turn mounted to a wall stud or other support structure. The open end of the electrical box is usually mounted flush with the outer surface of the wall. A cover plate or face plate is attached to the electrical device to cover the open end of the electrical box and to provide a decorative appearance. Face plates are typically attached by one or more screws that extend through a screw hole in the face plate and are threaded into the electrical device.

Various face plates have been produced having no visible screws or fasteners on the outer surface. The face plates typically have a snap mechanism that enables the attachment of the face plate to the electrical box or electrical device. One example is disclosed in U.S. Pat. No. 5,723,817 to Arenas et al. This cover plate assembly is suitable for single gang or multi gang boxes. The device includes an attachment plate having a tab at each end. A face plate is snapped onto the tabs to attach the face plate to the attachment plate.

Another example of a faceplate attachment assembly is disclosed in U.S. Pat. No. 5,189,259 to Carson et al. The face plate assembly includes a mounting plate having a hook-like portion. A face plate is provided with legs that extend outwardly and attach to the hook portion of the attachment plate to attach the cover plate to the attachment plate.

Another example of an attachment mechanism is disclosed in U.S. Pat. No. 4,733,330 to Tanaka et al. This patent also discloses an attachment plate which is attached to an electrical box where the attachment plate has a hook-like member. A cover plate includes legs with a hooked end for hooking onto the attachment plate.

Various other arrangements have been developed for attaching a face plate to an electrical box. One type of arrangement includes spring-like members that can snap into a hole in a mounting plate or clamp onto the electrical box or opening in the wall. Examples of this type of device are disclosed in U.S. Pat. No. 1,840,582 to Hubbell, U.S. Pat. No. 3,168,612 to Sorenson, U.S. Pat. No. 3,197,549 to Good, U.S. Pat. No. 4,211,905 to Quigley, and U.S. Pat. No. 4,340,795 to Arthur.

Various other arrangements for attaching a face plate to an electrical box are disclosed in U.S. Pat. No. 3,987,928 to Mori, U.S. Pat. No. 4,631,354 to Boteler, and U.S. Pat. No. 5,180,886 to Dierenbach et al.

While the prior attachment mechanisms for attaching a face plate to a wall have generally been suitable for the intended purpose, there is a continuing need in the industry for improved attachment mechanisms for the face plate.

SUMMARY OF THE INVENTION

The present invention is directed to a wall plate assembly. In particular, the invention is directed to a snap-on wall plate assembly for attachment to an electrical device.

One aspect of the invention is to provide a wall plate assembly that is simple and easy to install and provides secure attachment of the wall plate to the electrical device. The wall plate assembly of the invention includes a base plate that is attached to the electrical device and a cover plate that attaches to the base plate. A gasket can be positioned between the base plate and the electrical box.

Another aspect of the invention is to provide a wall plate assembly that is easy to manufacture and has a minimum number of parts and engagement components.

Another aspect of the invention is to provide a wall plate assembly where the wall plate can be attached to a multi gang electrical box and is able to fit neatly against the wall surface and is able to compensate for uneven wall surfaces.

Another aspect of the invention is to provide a wall plate assembly where each corner of the wall plate includes an attachment member so that each corner can be attached to the wall surface independent of the other corners so that the wall plate fits snugly against the wall surface around the perimeter. The attachment members at each corner allow the position of each corner to be adjusted with respect to the base.

The wall plate assembly of the invention includes a base plate which is attached to an electrical box and/or electrical device. The base plate has a plurality of coupling mechanisms for attaching to a cover plate. The cover plate includes attachment members that cooperate with the attachment members on the base plate to securely attach the cover plate to the base plate.

A further aspect of the invention is to provide a cover plate assembly where the cover plate is attached to a base plate by a connector that applies a biasing force against the base plate. In one embodiment, the biasing force increases the greater the distance between the cover plate and the base plate. As the cover plate is pulled away from the base plate, the biasing force is increased, thereby preventing inadvertent detachment of the cover plate from the base plate. The biasing force decreases as the cover plate is attached closer to the base plate for ease of assembly.

These and other aspects of the invention are basically attained by providing a wall cover plate assembly for covering an electrical device mounted to an electrical box. The assembly comprises a base plate having a substantially planar configuration with at least one opening for receiving the top face of the electrical device. The base plate has a first edge, a second edge opposite the first edge, a third edge extending between the first and second edges and a fourth edge extending between the first and second edges. The base has a plurality of screw holes for receiving a screw adapted for coupling the base plate to the electrical device and electrical box. A plurality of openings extends between a top surface and a bottom surface of the base plate. Each opening has a surface extending substantially perpendicular to a plane of the base plate and has a latch member extending from the surface. A cover plate has a top surface and a bottom surface with an opening to access the electrical device. The cover plate has a plurality of connectors extending from the bottom surface aligned with a respective opening in the base plate. Each connector has a longitudinal dimension with an engagement surface. The engagement surface is oriented at an incline with respect to a plane of the surface of the opening in the base plate and extends toward the surface of the opening. The engagement surface has a plurality of teeth for coupling with the latch member.

The various aspects of the invention are also attained by providing a cover plate assembly for connecting to a wall mounted electrical device mounted in an electrical box. The assembly comprises a base having a substantially planar configuration with a dimension to overlie the electrical device and has a first and an opposite second side edge, and a third and an opposite fourth side edge. The third and fourth side edges extend substantially perpendicular to the first and second side edges. The base has a plurality of recesses spaced inwardly from the side edges. Each of the recesses has an outwardly facing surface extending substantially perpendicular to a plane of the base, and has a latch member on the outwardly facing surface. A cover plate has a planar configuration with an outer dimension to cover the base. The cover plate has a top wall with a peripheral edge. A lip extends substantially perpendicular from the peripheral edge of the top wall. The top wall has a plurality of connectors corresponding to a respective recess in the base. Each of the connectors has a longitudinal dimension with an inwardly facing surface oriented at an inward incline with respect to a plane of the top wall and at an incline with respect to the outwardly facing surface of the opening in the base plate. The connector has a plurality of recesses on the inwardly facing surface for mating with a respective connector.

The aspects of the invention are also attained by providing a cover plate assembly for a multi gang wall mounted electrical box having a plurality of electrical devices. The assembly comprises a base having a plurality of access openings aligned with a respective electrical device. The base has a plurality of screw holes for receiving a screw for coupling the base to the electrical box and electrical devices. The base has an outer peripheral edge with a first side and an opposite second side. A plurality of recesses extend through the base and have an outwardly facing surface with a latch member on the outwardly facing surface and extending into the recess. A coupling tab extends outward from the first side edge and second side edge. A cover plate is coupled to the base. The cover plate has a top wall and a plurality of access openings for the electrical devices. The cover plate has a lip extending from a peripheral edge of the top wall and has a dimension to surround the base. The lip has an inwardly facing coupling member for coupling with the coupling tab on the first side edge and second side edge of the base. A plurality of connectors extends from a bottom surface of the top wall of the cover plate for coupling with a respective latch member. Each of the connectors has a longitudinal dimension with an inclined inner surface extending toward a bottom end of the outwardly facing surface of a respective recess in the base. The inclined inner surface has a plurality of teeth for engaging the latch member.

These and other aspects of the invention will become apparent from the following detailed description of the invention, which in conjunction with the annexed drawings, disclose various embodiments of the invention.

BRIEF DESCRIPTION OF THE DRAWINGS

The following is a brief description of the drawings in which.

DETAILED DESCRIPTION OF THE INVENTION

The present invention is directed to a wall plate assembly. The invention is particularly directed to a wall plate that is coupled to a base by a snap connection for ease of assembly and removal.

Figure 3:
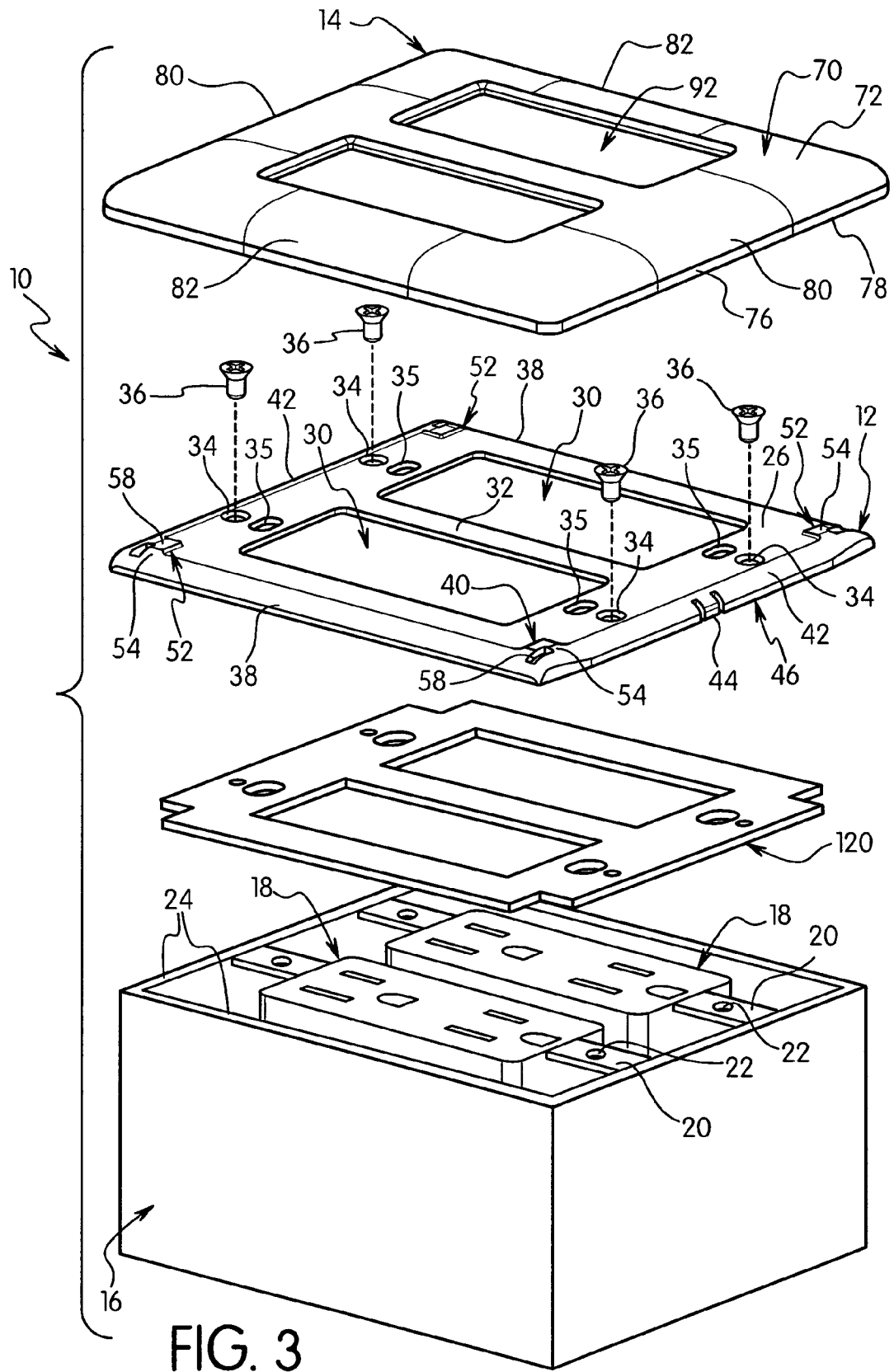
FIG. 3 is an exploded perspective view of the assembly of FIG. 1.

Referring to the drawings, the wall cover plate assembly 10 includes a base 12 and a cover 14. Base 12 and cover 14 are preferably made of a plastic material. Cover plate assembly 10 is adapted for connecting to an electrical box 16 as shown in FIG. 3 where the cover 14 is attached to the base 12 with visible screws or fasteners.

Figure 2:
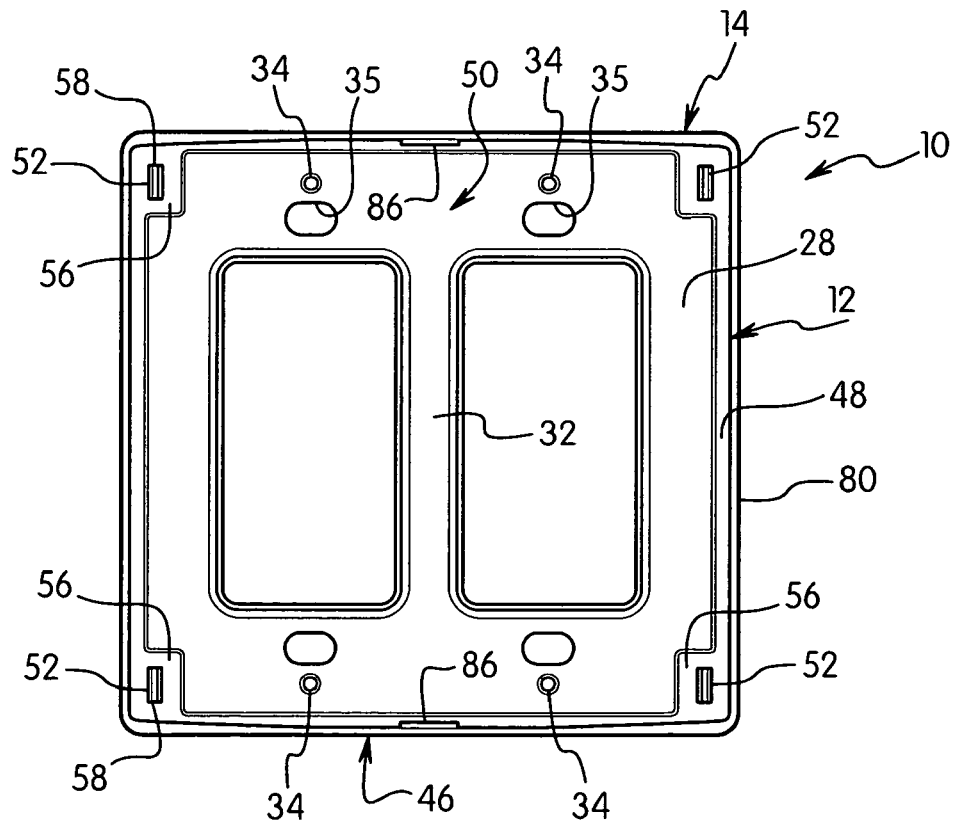
FIG. 2 is a bottom view of the cover plate assembly.

Electrical box 16 in the embodiment illustrated is a two gang electrical box supporting two electrical wiring devices 18. Wiring devices 18 as shown in FIG. 2 are a duplex receptacle. In alternative embodiments, wiring devices 18 can be a switch, GFI device or other electrical component. Electrical box 16 is a standard construction for attachment to a wall, stud or other support structure. Electrical devices 18 are mounted within electrical box 16 and connected to suitable wiring. Wiring device 18 includes a mounting tab 20 for attaching wiring device 18 to electrical box 16. Tab 20 includes a threaded hole 22 for receiving a screw for attaching a conventional face plate. In other embodiments, electrical box 16 can be a single gang or multiple gang box.

Base 12 is in the form of a base plate having a planar structure with an outer dimension for overlying wiring devices 18 and overlying a top end 24 of electrical box 16. In one embodiment, base 12 has a dimension corresponding substantially to the outer dimension of electrical box 16. As shown, base 12 has a dimension corresponding to the two gang electrical box 16. Base 12 has a top surface 26 and a bottom surface 28. Access openings 30 extend through base 12 between top surface 26 and bottom surface 28. Access openings 30 are aligned with a respective wiring device 18. Access openings 30 have a dimension to allow a top end of the respective wiring device 18 to extend through. As shown in FIGS. 2 and 3, a connecting portion 32 extends between opposite side edges between adjacent access openings 30.

Base 12 includes a plurality of screw holes 34 for receiving a mounting screw 36. Screw holes 34 can be circular shaped or oval shaped to allow some lateral adjustment of base 12 with respect to electrical box 16 and wiring devices 18. In the embodiment shown, oval shape openings 35 are provided adjacent screw holes 34.

Top surface 26 of base 12 has a substantially flat planar configuration with opposite ends 38. Base 12 as shown in FIG. 3 has a raised portion 40 adjacent ends 38 so that ends 38 have a thickness greater than the thickness of the remaining portions of base 12. Opposite side ends 42 of base 12 extend between ends 38. Side ends 42 are provided with a coupling member 44. Coupling member 44 in a preferred embodiment is positioned at about a midpoint between ends 38. Coupling members 44 in the embodiment shown are in the form of an outwardly extending tab or projection. As shown in FIGS. 2 and 3, coupling members 44 are positioned substantially in alignment with connecting portion 32 between access openings 30 of base 12.

Base 12 has a peripheral edge defined by ends 38 and sides 42 with a downwardly extending lip 46. Lip 46 has a substantially flat outer face 48 and defines a recessed area 50 of base 12.

Figure 4:
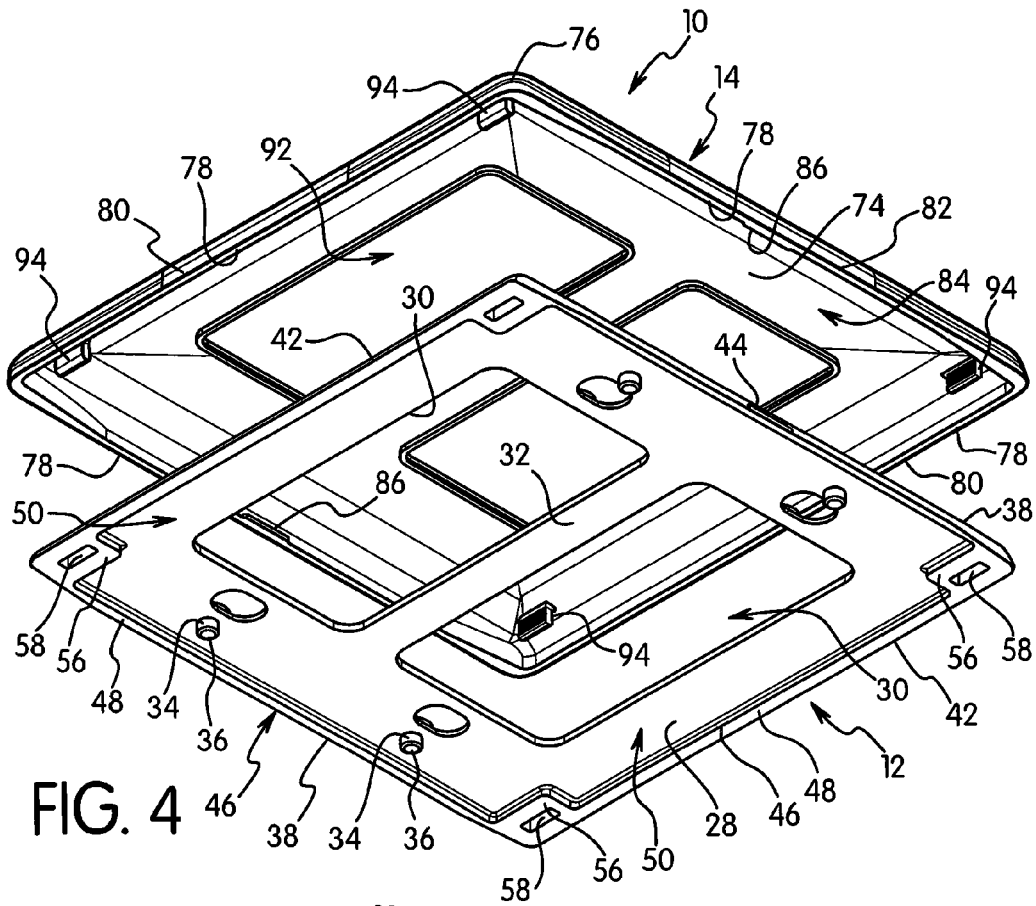
FIG. 4 is an exploded bottom perspective view of the cover plate assembly of FIG. 1.
Figure 5:
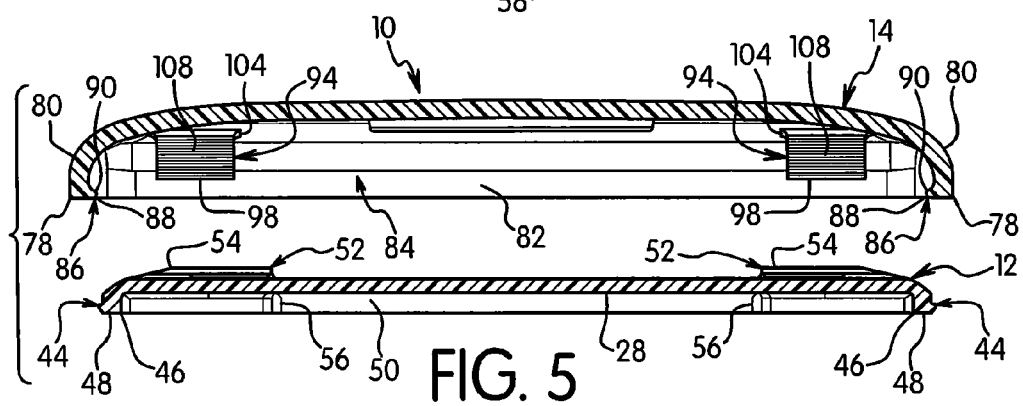
FIG. 5 is an exploded cross-sectional view of the cover plate assembly.

Base 12 includes connecting members 52 for connecting cover 14 to base 12. In one embodiment of the invention, connecting members 52 are positioned at the four corners of base 12 as shown in FIG. 2 and FIG. 3. Connecting members 52 are formed by a raised portion 54 extending upwardly from top surface 26 and a raised bottom portion 56 extending from bottom surface 28 as shown in FIGS. 2 and 4. Connecting members 52 have an opening 58 which forms a recess for receiving a coupling member on cover 14 as discussed herein. Opening 58 in the embodiment illustrated forms a passage extending through base 12 between the top surface of raised portion 54 and the bottom surface of raised portion 56 as shown in FIG. 5. Opening 58 in the embodiment shown has a substantially square configuration with a coupling surface 60. Coupling surface 60 has a substantially flat planar configuration extending substantially perpendicular to the plane of base 12. A latch member 62 extends outwardly from the face of coupling surface 60.

Latch member 62 in a preferred embodiment is positioned at a top end 64 of opening 58 within raised portion 54 so that latch 62 is positioned above top surface 26 of base 12. Latch 62 forms a hook-like member having an inclined top surface 66 and a bottom surface 68 extending substantially perpendicular to the plane of coupling surface 60. Preferably, latch 62 has a length substantially equal to the width of coupling surface 60.

Cover plate 14 has a substantially planar configuration with an outer dimension complementing the outer dimension of base 12. Cover 14 has a top wall 70 with a top surface 72 and a bottom surface 74. Top wall 70 has a peripheral edge 76 with a downwardly extending lip 78. Lip 78 defines end portions 80 and side portions 82. Lip 78 forms a recessed area 84 of cover plate 14 shown in FIG. 4.

Figure 6:
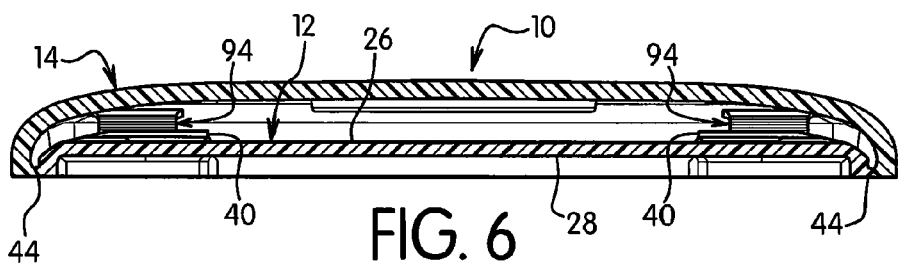
FIG. 6 is a cross-sectional view taken along line 6-6 of FIG. 1 of the cover plate assembly showing the cover plate attached to the base plate.
Figure 7:
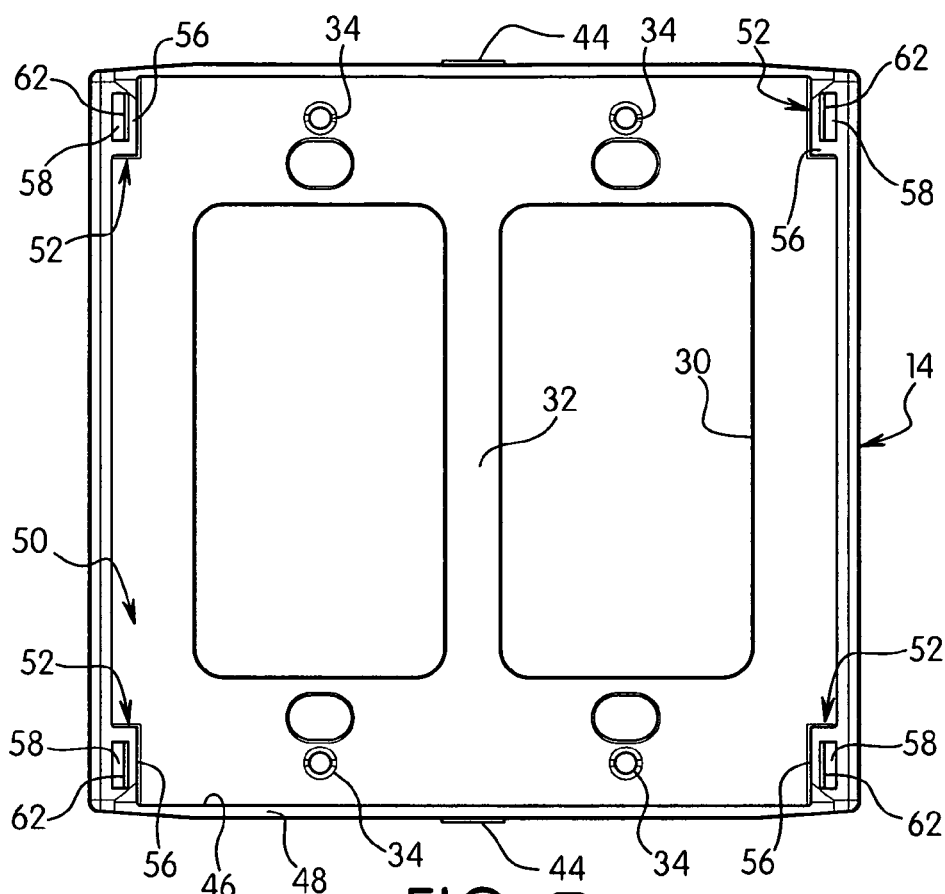
FIG. 7 is a bottom view of the base plate.

Lip 78 has a dimension to fit over base 12 as shown in FIGS. 5 and 6. Side portions 82 are provided with a coupling member 86 on an inner face of lip 78 positioned at a midpoint to align with coupling member 44 in base 12. In the embodiment illustrated, coupling member 44 of base 12 is a tab extending outwardly. Coupling member 86 in cover plate 14 is an inwardly extending tab or detent for mating with coupling member 44. In one embodiment, coupling member 86 is an inwardly extending tab or projection having an inclined bottom surface 88 and a top surface 90 so that inclined surface 88 can slide over the outer edge of base 12 into locking engagement with coupling member 44 of base 12 as shown in FIG. 6. In alternative embodiments, coupling member 44 can be a detent and coupling member 86 can be a corresponding recess.

Referring to FIG. 3, coupling member 44 is formed as a tab 45 cut from base 12. Tab 45 is sufficiently resilient to deflect when engaging cover 12 and coupling member 86. The tab 45 is able to bend inwardly when coupling to cover 12 and apply a spring biasing force against coupling member 86 and form a snap connection.

Figure 1:
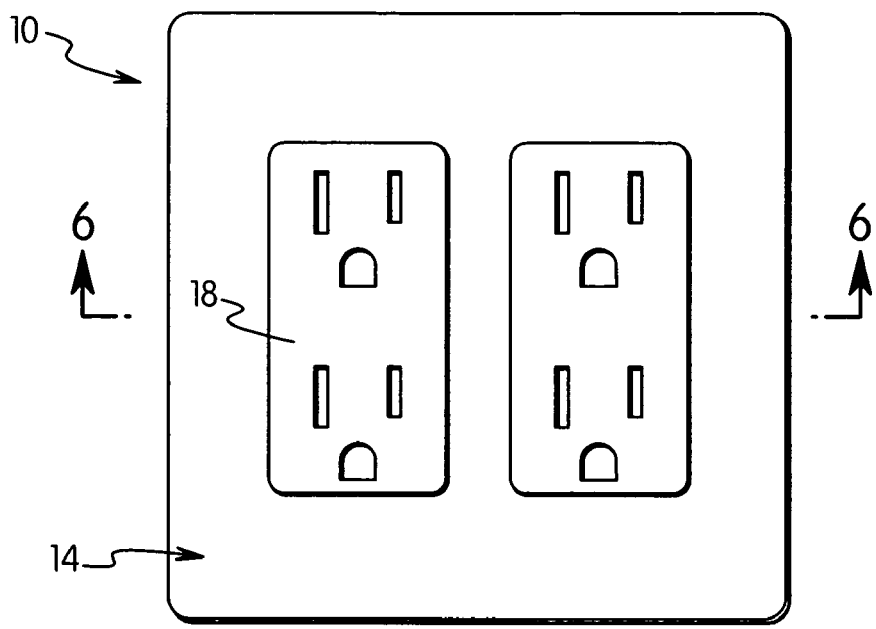
FIG. 1 is a top view of the cover plate assembly in one embodiment of the invention attached to an electrical box and the corresponding electrical devices.

Top wall 70 of cover plate 14 includes access openings 92. Access openings 92 are aligned with access openings 30 in base 12. As shown in FIG. 1, access openings 92 have a dimension corresponding substantially to electrical devices 18 so that electrical devices 18 extend through access openings.

Figure 8:
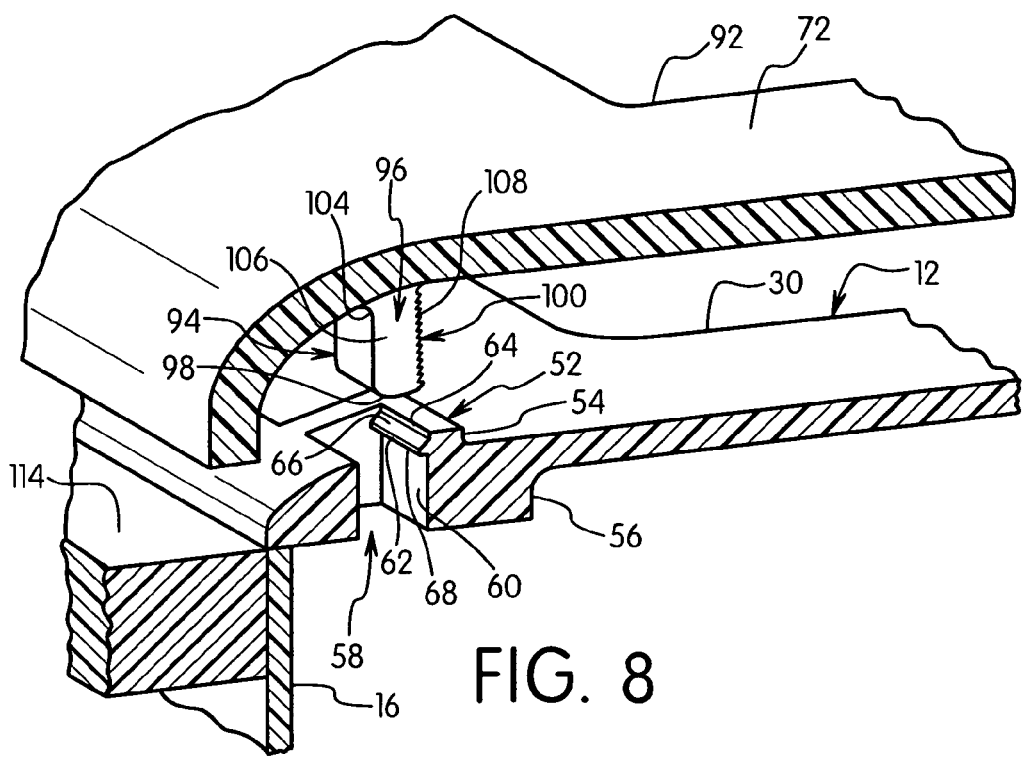
FIG. 8 is a partial cross-sectional view showing the coupling mechanism for the cover plate assembly.
Figure 9:
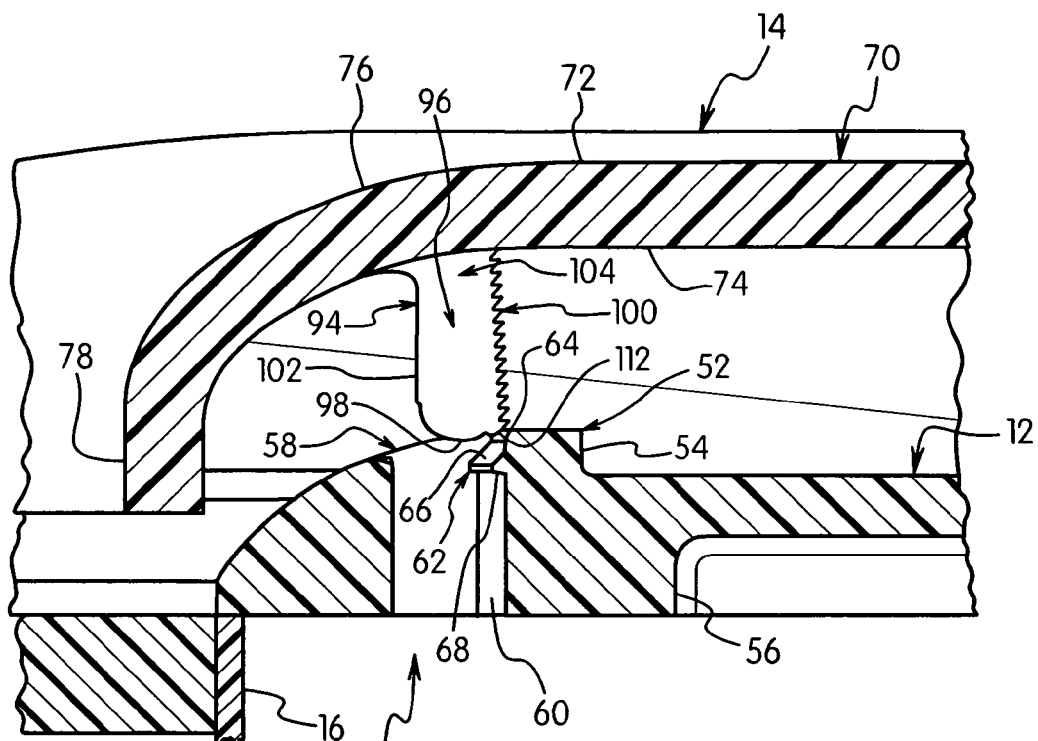
FIG. 9 is a partial cross-sectional view showing the cover plate during assembly with the base plate.
Figure 10:
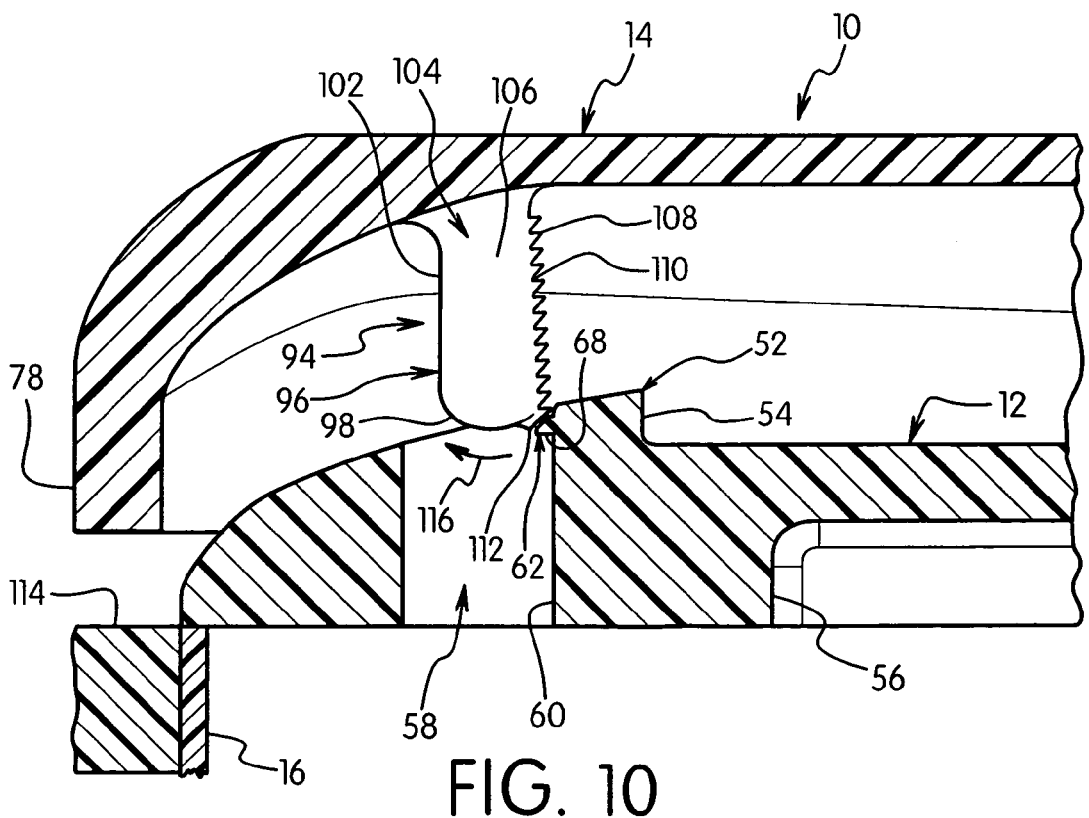
FIG. 10 is a cross-sectional end view showing the connector of the cover plate engaging the base plate.

Bottom surface 74 of top wall 70 of cover plate 14 is provided with connectors 94 for mating with connecting members 52 in base 12. Connectors 94 are positioned in each of the four corners of cover plate 14 and aligned with a respective opening 58 of connecting members 52. Connectors 94 have a body portion 96 that extends downwardly from top wall 70 of cover plate 14 as shown in FIG. 4. As shown in FIGS. 8-10, body 96 of each connector 94 has a longitudinal dimension with a width that increases gradually toward an axial end 98. Body 96 has a coupling surface 100 that is inclined with respect to the plane of top wall 70. As shown in FIG. 6, coupling surface 100 extends slightly inwardly at angle Θ as shown in FIG. 10. Body 96 has a rear surface 102 that is tapered slightly outwardly toward axial end 98 so that a base portion 104 is thinner than the remaining portion of body 96. Base portion 104 allows limited bending of connector 94 with respect to cover plate 14.

Axial end 98 of body 96 has a rounded end. Body 96 has side surfaces 106 that are substantially perpendicular to the plane of rear surface 102 and connecting surface 100. Coupling surface 100 is provided with a plurality of teeth 108 which form a plurality of recesses 110. The axial end of coupling surface 100 and teeth 108 have a cam surface 112 for mating with latch member 62.

Figure 12:
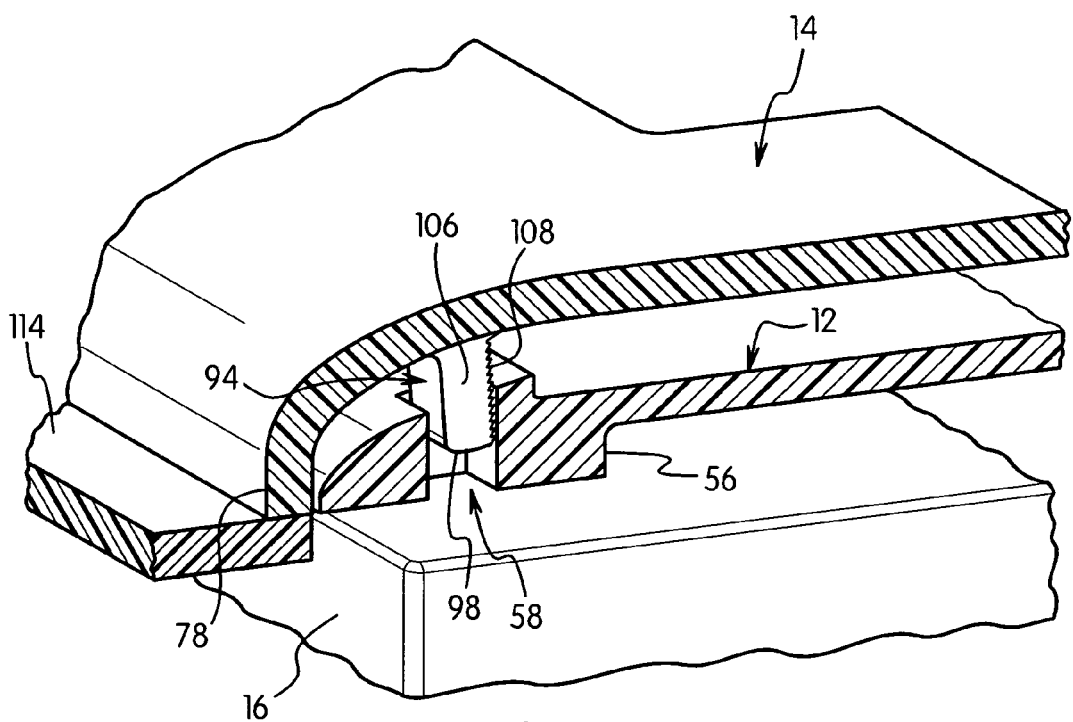
FIG. 12 is a cross-sectional view showing the cover plate attached to the base plate.

Cover plate assembly 10 is constructed to provide easy assembly of cover plate 14 without any visible screws or fasteners for attaching the cover plate to electrical box 16 or wiring device 18. Connectors 94 of cover plate 14 are angled and oriented to engage connecting members 52 of base 12 to provide adjustment of the position of cover plate 14 on base 12 so that cover plate 14 is able to fit uniformly against a wall surface 114 as shown in FIG. 12. Connectors 94 are angled with respect to coupling surface 60 and latch 62 so that the force necessary to remove cover plate 14 from base 12 increases as the cover plate is pulled away from base 12.

Figure 11:
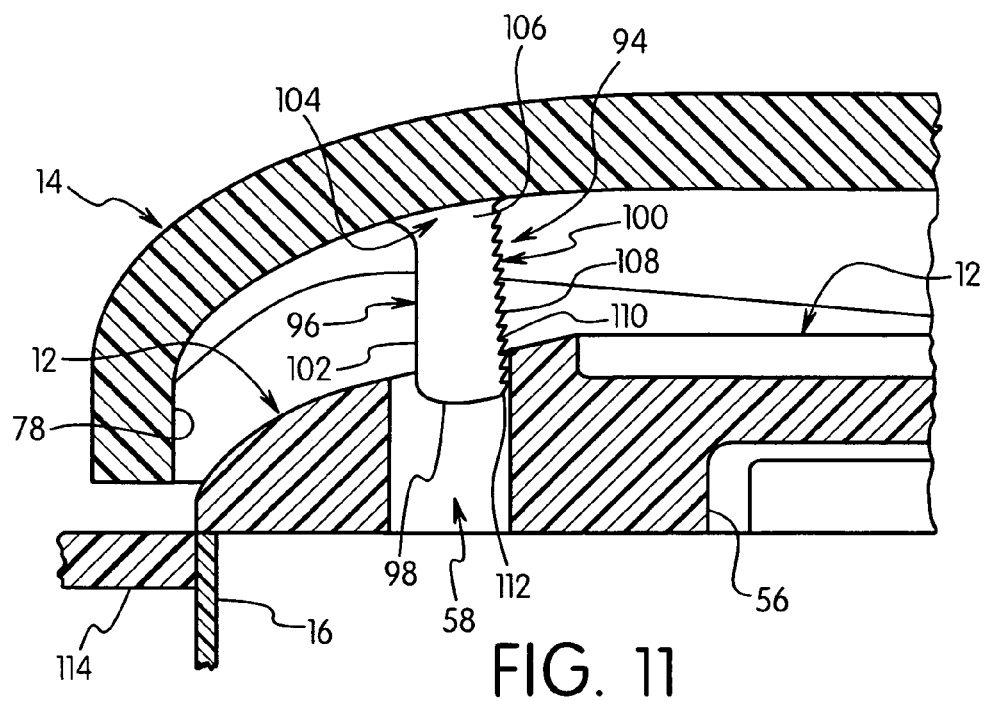
FIG. 11 is a cross-sectional view showing the connector during coupling with the base plate.

Cover plate 14 is connected to base 12 by positioning cover plate 14 above base 12 with connectors 94 aligned with openings 58 as shown in FIGS. 8 and 9. The inclined coupling surface 100 of connector 94 is angled such that cam surface 112 engages latch 62 as connector 94 is inserted into opening 58 as shown in FIG. 10. Latch 62 causes connector 94 to bend away from coupling surface 60 indicated by arrow 116 shown in FIG. 10. The tapered shape of body 96 enables connector 94 to bend about the base portion 104. The resilience of body portion 96 causes a biasing force toward coupling surface 60 as latch 62 slides over teeth 108 of connector 94. The biasing force decreases the further connector 94 is inserted into opening 58 as a result of the inclined connecting surface 100 of connector 94 and latch member 62 extending outwardly from coupling surface 60 of opening 58. Connector 94 is inserted into opening 58 until outer face 48 of lip 46 abuts wall 114 as shown in FIG. 12. Connector 94 in the position shown in FIG. 12 has a smaller biasing force against latch 62 than in the position shown in FIG. 11. The biasing force applied by the connector 94 urges the cover plate towards the base plate.

In one embodiment, latch 62 extends outwardly from coupling surface 60 a distance so that teeth 108 of connector 94 do not apply a significant biasing force against coupling surface 60 when connector 94 is inserted into opening 58. In an alternative embodiment, latch 62 can have a dimension and coupling surface 60 can be positioned so that teeth 108 of connector 94 contact coupling surface 60 when inserted into opening 58, thereby maintaining a substantially constant biasing force of connector 94 against latch 62.

In a preferred embodiment, a gasket 120 is provided between cover assembly 10 and electrical box 16 as shown in FIG. 3 to provide a weatherproof seal. Gasket 120 has a configuration corresponding to the shape of the base 12. Gasket 120 preferably is made as a one piece member from a flexible rubber material that is sufficiently flexible and resilient to form a watertight seal between base 12 and electrical box 16 and electrical wiring device 18. In the embodiment illustrated, gasket 120 has a dimension to be received in the recessed area 50 of base 12. Gasket 120 has notched portions 122 in each corner corresponding to the shape and dimension of raised portions 56. Access openings 124 are provided for electrical devices 18 and are aligned with access openings 30 in base 12. Screw holes 126 and openings 128 are also provided and aligned with screw holes 34 and openings 35, respectively, in base 12.

In the embodiments shown in the Figures, the teeth on connectors 94 face inwardly toward a center portion of cover plate 14. In other embodiments, the teeth on the connectors can face outwardly and mesh with corresponding latch members that face inwardly.

The coupling mechanism of cover plate assembly 10 enable cover plate 14 to contact the outer surface of wall 114 to provide neat appearance with no gaps or spaces between cover plate 14 and the surface of the wall. The coupling members on the outer edge of the base plate are preferably positioned at a midpoint between the coupling members positioned at each of the corners to resist bowing or twisting of the cover plate and provide continuous contact of the cover plate against the wall. The connectors of the cover plate enable independent adjustment and positioning with respect to the base plate and the wall surface so that the cover plate seats securely against he wall surface.

While various embodiments have been chosen to illustrate the invention, it will be understood by those skilled in the art that various changes and modifications can be made without departing from the scope of the invention as defined in the appended claims.

What is claimed is:

1. A wall cover plate assembly for covering an electrical device mounted to an electrical box, said assembly comprising:
    a base plate having a substantially planar configuration with at least one opening for receiving a top face of the electrical device, said base plate having a first end, a second end opposite said first end, a third end extending between said first and second ends and a fourth end extending between said first and second ends, said base having a plurality of screw holes for receiving a screw adapted for coupling said base plate to the electrical device and electrical box, and a plurality of openings extending between a top surface and a bottom surface of the base plate, each of said openings having a surface extending substantially perpendicular to a plane of said base plate and having a latch member extending from said surface; and
    a cover plate having a top surface and a bottom surface with an opening to access the electrical device, said cover plate having a plurality of connectors extending from said bottom surface of said cover plate aligned with one of said openings in said base plate, each said connector having a longitudinal dimension with an engagement surface, said engagement surface oriented at an incline with respect to a plane of said surface of a respective opening in said base plate and extending toward said surface of said respective opening, said engagement surface having a plurality of teeth for coupling with said latch member.

2. The assembly of claim 1, wherein
    said latch member is positioned at a top end of said surface of each of said openings in said base, and where said surface is a substantially flat planar surface.

3. The assembly of claim 2, wherein
    said openings in said base are formed in a raised portion extending upwardly from said top surface of said base plate and where said latch member is positioned above said top surface of said base plate.

4. The assembly of claim 1, wherein each of said connectors of said cover plate include a plurality of teeth to engage said latch member during insertion of each of said connectors into one of said openings and deflect each of said connectors outwardly to apply a biasing force against said latch member, and where said biasing force decreases as one of said connectors penetrates said opening.

5. The assembly of claim 1, wherein
    each of said connectors are independently adjustable in a respective opening whereby said cover plate uniformly contacts a wall surface.

6. The assembly of claim 1, wherein
    said bottom surface of said cover plate is spaced from said base plate when said cover plate is coupled to said base plate thereby allowing independent adjustment of said connectors of said cover plate, and
    said cover plate has a peripheral outer edge with a lip extending therefrom and having a length to contact a wall surface.

7. The assembly of claim 6, wherein
    said first and second ends of said base plate each have a first coupling member spaced between two adjacent openings; and
    said lip of said cover plate has an inner surface with a second coupling member for mating with said first coupling member.

8. The assembly of claim 7, wherein
    said electrical box is a multi gang box supporting a plurality of electrical devices, said first and second coupling members positioned at a midpoint between ends of said base plate and cover plate, respectively.

9. A cover plate assembly for connecting to a wall mounted electrical device mounted in an electrical box, the assembly comprising:
    a base having a substantially planar configuration with a dimension to overlie said electrical device and having a first and an opposite second end, and a third and an opposite fourth end, said third and fourth ends extending substantially perpendicular to said first and second ends, said base having a plurality of openings spaced inwardly from said ends, each of said openings having coupling surface extending substantially perpendicular to a plane of said base, and having a latch member on said coupling surface; and
    a cover having a planar configuration with an outer dimension to cover said base, said cover having a top wall with a peripheral edge, and a lip extending substantially perpendicular from said peripheral edge of said top wall, said top wall having a plurality of connectors corresponding to each of said openings in said base, each of said connectors having a longitudinal dimension with an inwardly facing surface oriented at an incline with respect to a plane of said top wall and at an incline with respect to an outwardly facing surface of each of said openings in said base, each of said connectors having a plurality of recesses on said inwardly facing surface for mating with a respective latch member.

10. The assembly of claim 9, wherein said latch members are positioned at a top end of said respective coupling surface of said openings in said base, and where said coupling surface is a substantially flat planar surface.

11. The assembly of claim 10, wherein said openings in said base are defined by a raised portion extending upwardly from said top surface of said base and where said latch member is positioned above said top surface of said base.

12. The assembly of claim 9, wherein each of said connectors are positioned so that said plurality of recesses on said connectors engage said latch member during insertion of said connector into said opening and deflect said connector outwardly from said base to apply a biasing force against said latch member.

13. The assembly of claim 12, wherein said biasing force decreases as said connector penetrates said opening.

14. The assembly of claim 12, wherein said biasing force is substantially constant as said connector penetrates said opening.

15. The assembly of claim 9, wherein each of said connectors are independently adjustable in one of said openings whereby said cover contacts a wall surface.

16. The assembly of claim 15, wherein said cover has a bottom surface spaced from said base when coupled to said base thereby allowing independent adjustment of said connectors.

17. The assembly of claim 9, wherein said first and second ends of said base have an outwardly facing first coupling member positioned at a midpoint of said first and second ends; and said lip has an inner surface with second coupling members for coupling with a first coupling member.

18. The assembly of claim 17, wherein said first coupling members of said base are a first projection; and said second coupling members of said cover are a second projection for mating with a respective first projection.

19. A cover plate assembly for a multi gang wall mounted electrical box having a plurality of electrical devices, the assembly comprising:

a base having a plurality of access openings aligned with a respective electrical device, said base having a plurality of screw holes for receiving a screw for coupling said base to said electrical box and said electrical devices, said base having an outer peripheral edge with a first end and an opposite second end, and a plurality of openings extending through said base, each of said openings having coupling surface with a latch member on said coupling surface and extending into said respective opening;

a coupling tab extending outward from said first end and second end;

a cover coupled to said base, said cover having a top wall and a plurality of access openings for said electrical devices, said cover having a lip extending from a peripheral edge of said top wall and having a dimension to surround said base, said lip having an inwardly facing coupling member for coupling with said coupling tab on said first side end and second side end of said base; and a plurality of connectors extending from a bottom surface of said top wall of said cover plate for coupling with a respective latch member, each of said connectors having a longitudinal dimension with an inclined inner surface extending toward a bottom end of said outwardly facing surface of a respective opening in said base, said inclined inner surface having a plurality of teeth for engaging said latch member.

20. The assembly of claim 19, wherein said latch members are positioned at a top end of the respective surface of said recesses in said base plate, and where said surface is a substantially flat planar surface.

21. The assembly of claim 20, wherein said recesses in said base are defined by a raised portion extending upwardly from a top surface of said base and where said latch member is positioned above said top surface of said base.

22. The assembly of claim 19, wherein each of said connectors are positioned so that said teeth on said connector engage said latch member during insertion of said connector into said recess and deflect said connector outwardly from said base to apply a biasing force against said latch member.

23. The assembly of claim 19, further comprising a gasket member positioned between said base and cover.

* * * * *